US008135909B2

(12) United States Patent
Houki

(10) Patent No.: US 8,135,909 B2
(45) Date of Patent: Mar. 13, 2012

(54) SYSTEM FOR STARTING A PRELOAD OF A SECOND PROGRAM WHILE A FIRST PROGRAM IS EXECUTING

(75) Inventor: Mitsunori Houki, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/946,009

(22) Filed: Sep. 22, 2004

(65) Prior Publication Data

US 2005/0066132 A1    Mar. 24, 2005

(30) Foreign Application Priority Data

Sep. 24, 2003   (JP) ................................. 2003-331964

(51) Int. Cl.
*G06F 12/00*    (2006.01)
(52) U.S. Cl. ........ 711/118; 711/140; 711/154; 717/121; 717/129
(58) Field of Classification Search .................. 711/140, 711/118, 154; 717/121, 129
See application file for complete search history.

(56) References Cited

U.S. PATENT DOCUMENTS

| 4,375,083 | A | * | 2/1983 | Maxemchuk ................. 704/278 |
| 4,481,573 | A | * | 11/1984 | Fukunaga et al. ............ 711/207 |
| 4,500,959 | A | * | 2/1985 | Kubo et al. .................... 712/207 |
| 4,742,452 | A | * | 5/1988 | Hirokawa ..................... 710/100 |
| 4,811,208 | A | * | 3/1989 | Myers et al. .................. 711/132 |
| 4,860,195 | A | | 8/1989 | Krauskopf |
| 5,053,944 | A | | 10/1991 | Krauskopf |
| 5,165,027 | A | | 11/1992 | Krauskopf |
| 5,179,702 | A | * | 1/1993 | Spix et al. ...................... 718/102 |
| 5,226,009 | A | * | 7/1993 | Arimoto .................. 365/189.04 |
| 5,249,278 | A | | 9/1993 | Krauskopf |
| 5,274,787 | A | | 12/1993 | Hirano et al. |
| 5,361,337 | A | | 11/1994 | Okin |
| 5,539,896 | A | * | 7/1996 | Lisle ............................. 711/150 |
| 5,701,435 | A | * | 12/1997 | Chi ............................... 711/159 |
| 5,901,225 | A | * | 5/1999 | Ireton et al. ....................... 714/7 |
| 6,055,621 | A | * | 4/2000 | Puzak ........................... 712/207 |
| RE36,766 | E | | 7/2000 | Krauskopf |
| 6,088,788 | A | | 7/2000 | Borkenhagen et al. |
| 6,134,710 | A | | 10/2000 | Levine et al. |

(Continued)

FOREIGN PATENT DOCUMENTS

CA     2 478 007 A1    9/2003

(Continued)

OTHER PUBLICATIONS

"Subroutine" retrieved from http://en.wikipedia.org/wiki/Subroutine arched on Apr. 5, 2004 by www.archive.org.*

(Continued)

*Primary Examiner* — Arpan P. Savla
(74) *Attorney, Agent, or Firm* — McDermott Will & Emery LLP

(57) ABSTRACT

A program is divided into unified units, and necessary instructions are downloaded for each of the unified units in advance from a main memory to a cache memory before a processor executes the instructions, to thereby reduce occurrence of a miss hit. If a miss hit occurs, an application program is switched to another one to conceal the miss hit penalty, to thereby enhance the serviceability of programs and thus achieve real time processing while swapping instructions.

1 Claim, 17 Drawing Sheets

U.S. PATENT DOCUMENTS

| | | | |
|---|---|---|---|
| 6,587,966 B1 * | 7/2003 | Chaiken et al. | 714/34 |
| 6,665,748 B1 * | 12/2003 | Slater et al. | 710/23 |
| 2001/0039558 A1 | 11/2001 | Kakisada et al. | |
| 2005/0268195 A1 * | 12/2005 | Lund et al. | 714/741 |

FOREIGN PATENT DOCUMENTS

| | | |
|---|---|---|
| CN | 1109967 C | 5/2003 |
| JP | 56-117384 | 9/1981 |
| JP | 56-159886 | 12/1981 |
| JP | 60-263238 | 12/1985 |
| JP | 02-109128 | 4/1990 |
| JP | 03-071248 | 3/1991 |
| JP | 03-154139 | 7/1991 |
| JP | 03-214337 | 9/1991 |
| JP | 07-056755 | 3/1995 |
| JP | 09-218823 | 8/1997 |
| JP | 10-340197 | 12/1998 |
| JP | 11-328123 | 11/1999 |
| JP | 2001-056781 | 2/2001 |
| JP | 2002-259209 | 9/2002 |
| JP | 2003-076559 | 3/2003 |
| WO | WO 03/021439 A1 | 3/2003 |
| WO | WO 03/075154 A | 9/2003 |

OTHER PUBLICATIONS

Hennessy, John L., Patterson, David A., "Computer Organization and Design, The Hardware/Software Interface", 1998, Morgan Kaufmann Publishers, Inc., Second Edition, pp. 133.*

David A. Patterson at al., "Computer Organization and Design", Nikkei BP, pp. 416-429.

Japanese Notice of Reasons for Rejection, w/ English translation thereof, issued in Japanese Patent Application No. JP 2003-331964 dated Jan. 26, 2010.

Japanese Notice of Reasons for Rejection, w/ partial English translation thereof, issued in Japanese Patent Application No. JP 2003-331964 dated May 31, 2011.

Chinese Office Action for Corresponding Application No. 200410011845.7 issued Jan. 12. 2007.

Dai, M., et al. "Microcomputer Technology and Application—from 16 digits to 32 digits" QinHua University, Second Version, May 1999 p. 547, lines 3-18.

* cited by examiner

SYSTEM FOR STARTING A PRELOAD OF A SECOND PROGRAM WHILE A FIRST PROGRAM IS EXECUTING

BACKGROUND OF THE INVENTION

The present invention relates to an information processing control system, and more particularly, relates to assisting a system required to achieve real time processing while swapping instructions stored in a cache memory.

FIG. 15 shows a configuration of an information processing control system using a general cache memory. This system includes: a main memory 400H for storing all instructions of a program; a cache memory 401H for storing only necessary instructions; a cache controller 402H for controlling the main memory and the cache memory; and a processor 403H for executing instructions stored in the cache memory.

In the information processing control system described above, when a necessary instruction exists in the cache memory 401H, the processor 403H decrypts (i.e., decodes) and executes the instruction stored in the cache memory 401H. When a necessary information does not exist in the cache memory 401H, a miss-hit (which is also known as a cache miss) occurs, and the processor 403H is halted, or polling (waiting) is performed with a kernel program. During this halt or polling, the cache controller 402H transfers a necessary instruction from the main memory 400H to the cache memory 401H. Once the instruction is available in the cache memory 401H, the processor 403H restarts the execution from the instruction at which the miss-hit has occurred.

FIG. 16 shows a flow of programs followed when a program is executed while instructions stored in the cache memory are swapped in the information processing control system described above (see David A. Patterson/John L. Hennessy, "Computer Organization and Design", for example). In FIG. 16, the reference numeral 420 denotes a time flow, 421 denotes processing of a kernel program, and 422 denotes processing of an application program. The reference numeral 423 denotes a program flow alternating between the kernel program and the application program, 424 denotes start of downloading (which may be also be known as pre-fetching) of a necessary instruction from the main memory to the cache memory, and 425 denotes a miss hit interrupt occurring when a necessary instruction does not exist in the cache memory. Times 420t, 423t and 426t denote times at which the program processing shifts from the kernel program to the application program, times 421t and 424t denote times at which the program processing shifts from the application program to the kernel program, and times 422t and 425t denote times at which downloading of a necessary instruction from the main memory to the cache memory is started.

The program flow 423 alternating between the kernel program and the application program will be described. The program processing, started with the kernel program, shifts to the application program at time 420t. The application program is then executed until a miss hit interrupt 425 occurs. When the miss hit interrupt 425 occurs at time 421t, the program processing shifts from the application program to the kernel program. At time is 422t, at which polling with the kernel program is underway, downloading of a necessary instruction from the main memory to the cache memory is started. When the downloading is completed at time 423t, the processing shifts from the kernel program to the application program, and the application program is restarted from the instruction at which (421t) the miss hit interrupt 425 has occurred. It is noted that polling may be done with the kernel program, or execution may be halted with the application program, during the time period from the occurrence of the miss hit interrupt 425 until the completion of the downloading.

FIG. 17 shows an internal configuration of the cache controller 402H of the information processing control system described above (see Non-Patent Literature 1, for example). In FIG. 17, the reference numeral 440 denotes a cache table register showing the correspondence between the logical address in a program and the physical address.

The reference numeral 442 denotes a tag address, 443 denotes a physical address, and 441 denotes a valid flag indicating whether the correspondence between the tag address 442 and the physical address 443 is valid or invalid. The reference numeral 444 denotes the higher-order part of a logical address in a program, and 445 denotes the lower-order part of the logical address in a program. The reference numeral 446 denotes the higher-order part of a cache address, and 447 denotes the lower-order part of the cache address, which is the same as the lower-order part 445 of the logical address. The reference numeral 449 denotes a comparator circuit, and 450 denotes a miss hit flag with which a miss hit interrupt occurs.

The operation of the circuit described above is as follows. If the higher-order part 444 of the logical address in a program and the tag address 442 are found identical to each other by comparison with the comparator circuit 449 and also the valid flag 441 is valid, the higher-order part of the physical address 443 is sent to the cache memory 401H as the higher-order part 446 of the cache address, together with the lower-order part 445 of the logical address in the program as the lower-order part 447 of the cache address. If there is no item in the cache table register 440 satisfying that the higher-order part 444 of the logical address in a program and the tag address 442 are found identical to each other by comparison with the comparator circuit 449 and also the valid flag 441 is valid, the miss hit flag 450 goes active, causing occurrence of a miss hit interrupt.

The conventional information processing control system described above has problems as follows. In the conventional information processing control system, when an instruction necessary for execution of a program does not exist in the cache memory, a miss hit occurs and the application program is halted until the necessary instruction is downloaded into the cache memory. This halt situation occurs frequently, and for this reason, the system fails to guarantee real time processing while swapping instructions.

The conventional information processing control system is not provided with such a mechanism that when a miss hit occurs in a certain application program, another application program is started, and during execution of the latter application program, an instruction necessary for execution of the former application program in which the miss hit has occurred is downloaded from the main memory to the cache memory. Therefore, the serviceability of the processor decreases.

In the conventional information processing control system, the cache table register does not include flags indicating the status of DMA for downloading and the miss hit status. Therefore, it is not possible to construct an information processing control system that achieves real time processing while swapping instructions by downloading a necessary instruction in advance from the main memory to the cache memory before the processor executes the instruction and also switching an application program to another one once a miss hit interrupt occurs.

In the conventional information processing control system, only the valid flag is used as the flag indicating completion of DMA for downloading of an instruction. Therefore, an interrupt occurs every time DMA is completed. Since the program is switched at occurrence of an interrupt, a loss due to this switching arises frequently. This decreases the processing efficiency of the processor.

SUMMARY OF THE INVENTION

An object of the present invention is providing an information processing control system capable of guaranteeing real time processing while swapping instructions.

The information processing control system of the present invention includes: a kernel program for controlling an operating system and an application program for executing an application; a main memory for storing all instructions of the kernel program and all instructions of the application program; a cache memory for storing only a necessary instruction; and a processor for executing the instruction stored in the cache memory, wherein the system has for downloading a necessary instruction in advance from the main memory to the cache memory before the processor executes the instruction inside the kernel program and wherein before starting the application program, the kernel program sets in a register inside the processor, the timing (program counter value) at which the program for downloading is started, in the case that a program counter value of the application program agrees with the program counter value set in the register, the program for downloading in the kernel program is started, and the program for downloading downloads an instruction needed by the processor in advance from the main memory to the cache memory before the processor executes the instruction.

The information processing control system described above is advantageous in that the frequency of occurrence of miss hits can be reduced, and real time processing can be achieved while swapping instructions.

In the information processing control system described above, preferably, the kernel program and the application program are divided into unified units, and the program for downloading downloads instructions for each of the unified units in advance from the main memory to the cache memory before the processor executes the instructions.

The information processing control system described above is advantageous in that the frequency of occurrence of miss hits can be reduced, the miss hit penalty can be reduced, and thus higher-speed real time processing can be achieved while swapping instructions.

Preferably, the information processing control system described above further includes a cache controller for determining whether or not a necessary instruction exists in the cache memory and transferring a necessary instruction from the main memory to the cache memory, and a mechanism for monitoring a state of downloading for each unified unit, the mechanism being provided inside the cache controller, wherein the program for downloading checks the state of downloading for each unified unit, the state being monitored by the mechanism in the cache controller, and when the downloading is not completed and is not underway, the program for downloading downloads a necessary instruction in advance from the main memory to the cache memory before the processor executes the instruction.

The information processing control system described above is advantageous in that module-unit preloading can be performed at appropriate times by an appropriate number of times. Note herein that downloading of a necessary instruction in advance from the main memory to the cache memory before the processor executes the instruction is called preloading, and that dividing the kernel program and the application program into unified units is called modularization.

Preferably, the information processing control system of the present invention includes a miss hit interrupt and a DMA done interrupt, which are provided as interrupt means for the processor, and the system has an arrangement enabling the kernel program to switch an application program with the miss hit interrupt, and resume the application program in which the miss hit interrupt has occurred with the DMA done interrupt.

The information processing control system described above is advantageous in that the miss hit penalty generated by downloading an instruction from the main memory to the cache memory can be concealed, to thereby enhance the serviceability as the processor.

In the information processing control system described above, preferably, the system has application program switch control means in a program, by monitoring the status of the cache controller.

The information processing control system described above is advantageous in that the miss hit penalty generated by executing preloading or downloading can be concealed.

In the information processing control system described above, preferably, the system includes a table of correspondence between a logical address and a physical address of an instruction, together with a valid/invalid flag, a miss hit management flag and a DMA management flag attached to the table, for each of the unified units.

The information processing control system described above is advantageous in that module-unit preloading can be achieved, and also program execution can be made while switching an application program to another one once a miss hit interrupt occurs. Therefore, an information processing control system that achieves real time processing while swapping instructions can be constructed.

Preferably, the information processing control system described above further includes a miss hit interrupt mechanism for implementing miss hit interrupt processing using an instruction fetch program counter value at occurrence of a miss hit, wherein, with the miss hit interrupt processing, the system has means enabling the kernel program to switch an application program.

The information processing control system described above is advantageous in that both a miss hit interrupt occurring when preloading is underway and a miss hit interrupt occurring when preloading is not underway can be processed.

Preferably, the information processing control system described above further includes a DMA done interrupt mechanism for issuing a DMA done interrupt using the miss hit management flag and the DMA management flag, wherein, with the DMA done interrupt mechanism, the system has means permitting the kernel program to resume the application program in which a miss hit interrupt has occurred.

The information processing control system described above is advantageous in that the program switch loss that otherwise occurs every time DMA is completed can be reduced, reduction in processor processing efficiency can be suppressed, occurrence of a DMA done interrupt can be suppressed, and occurrence of a DMA done interrupt can be controlled.

In the information processing control system described above, preferably, the kernel program and the application program are divided into unified units, and the system has an arrangement of giving control for downloading instructions for each of the unified units in advance from the main memory to the cache memory before the processor executes the instructions.

The information processing control system described above is advantageous in that the preloading execution status can be determined from the DMA process flag, to enable execution of preloading at appropriate times by an appropriate number of times.

In the information processing control system described above, preferably, a miss hit interrupt and a DMA done interrupt are provided as interrupt means for the processor, and the system has an arrangement enabling the kernel program to switch an application program with the miss hit interrupt, and resume the application program in which the miss hit interrupt has occurred with the DMA done interrupt.

The information processing control system described above is advantageous in that the miss hit penalty generated by execution of preloading or downloading can be concealed, and also the application program in which a miss hit interrupt has occurred can be resumed in a shorter time.

Preferably, in the information processing control system described above, the system has a mechanism of switching an application program at occurrence of a miss hit and thereafter masking a DMA done interrupt to be issued.

The information processing control system described above is advantageous in that processing of the current application program can be protected, and the application program in which the miss hit interrupt has occurred can be resumed because the DMA done interrupt occurs again at the time of removal of the interrupt masking.

Preferably, the information processing control system described above further includes an instruction decryption device for decrypting an instruction in the cache memory and a status management device for managing the status of the processor, wherein the system has a mechanism negating the output of the instruction decryption device and resetting the status management device once an interrupt for the processor occurs.

The information processing control system described above is advantageous in that the status management device is prevented from falling in a wrong state due to an invalid instruction, and thus instruction decryption can be performed normally after resumption from an interrupt.

DESCRIPTION OF THE PREFERRED EMBODIMENTS

Figure 1:
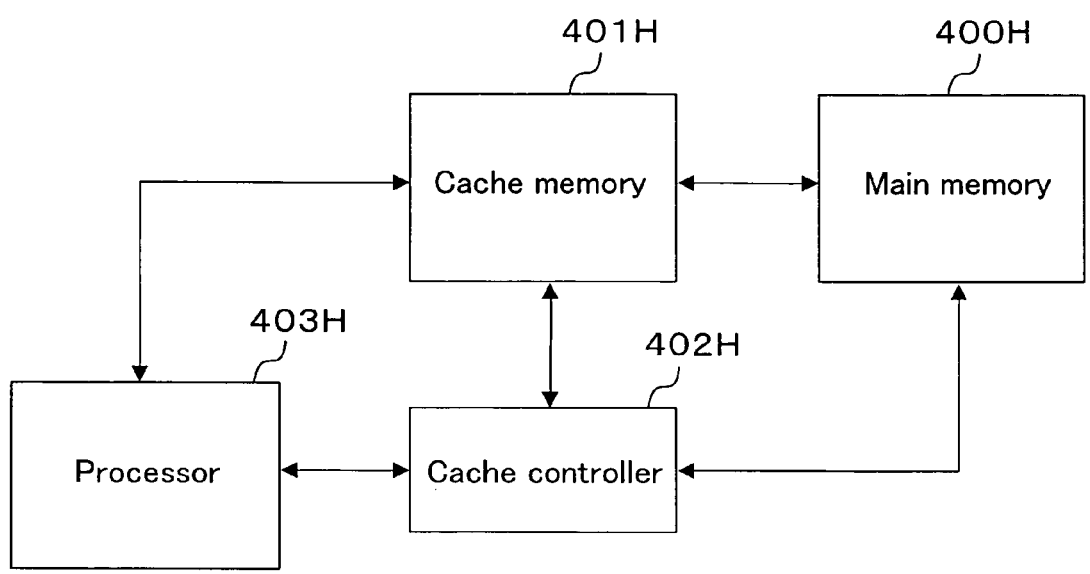
FIG. 1 is a block diagram showing the entire construction of an information processing control system of Embodiment 1 of the present invention.

Hereinafter, preferred embodiments of the present invention will be described in detail with reference to the accompanying drawings. Note that the same or analogous components are denoted by the same reference numerals throughout the drawings, and the description of such components is not repeated.

Embodiment 1

FIG. 1 shows a configuration of an information processing control system of Embodiment 1. This system includes: a main memory 400H for storing all instructions of a program; a cache memory 401H for storing only necessary instructions; a cache controller 402H for controlling the main memory 400H and the cache memory 401H; and a processor 403H for executing instructions stored in the cache memory 401H.

Hereinafter, the operation of the information processing control system shown in FIG. 1 will be described. Note herein that downloading of a necessary instruction from the main memory 400H to the cache memory 401H in advance before the processor 403H executes the instruction is called preloading. To achieve preloading, it is necessary to incorporate an arrangement for executing preloading in a program. In the case of preloading for the same application program, two types of methods for starting preloading may be adopted. In one method, the timing (program counter value) at which preloading is started is set in a register as a break point at the start of the application program. Once the program hits the break point, a break point interrupt occurs, causing start of the preloading. In the other method, a preloading start program is directly described in an application program, to start preloading. In the case of preloading for a different application program, the timing at which preloading for one application program is started is unknown to another application program. Therefore, a kernel program sets the timing at which preloading for each application program is started in its register as a break point. Once the program hits the break point, a break point interrupt occurs, causing start of the preloading.

Figure 2:
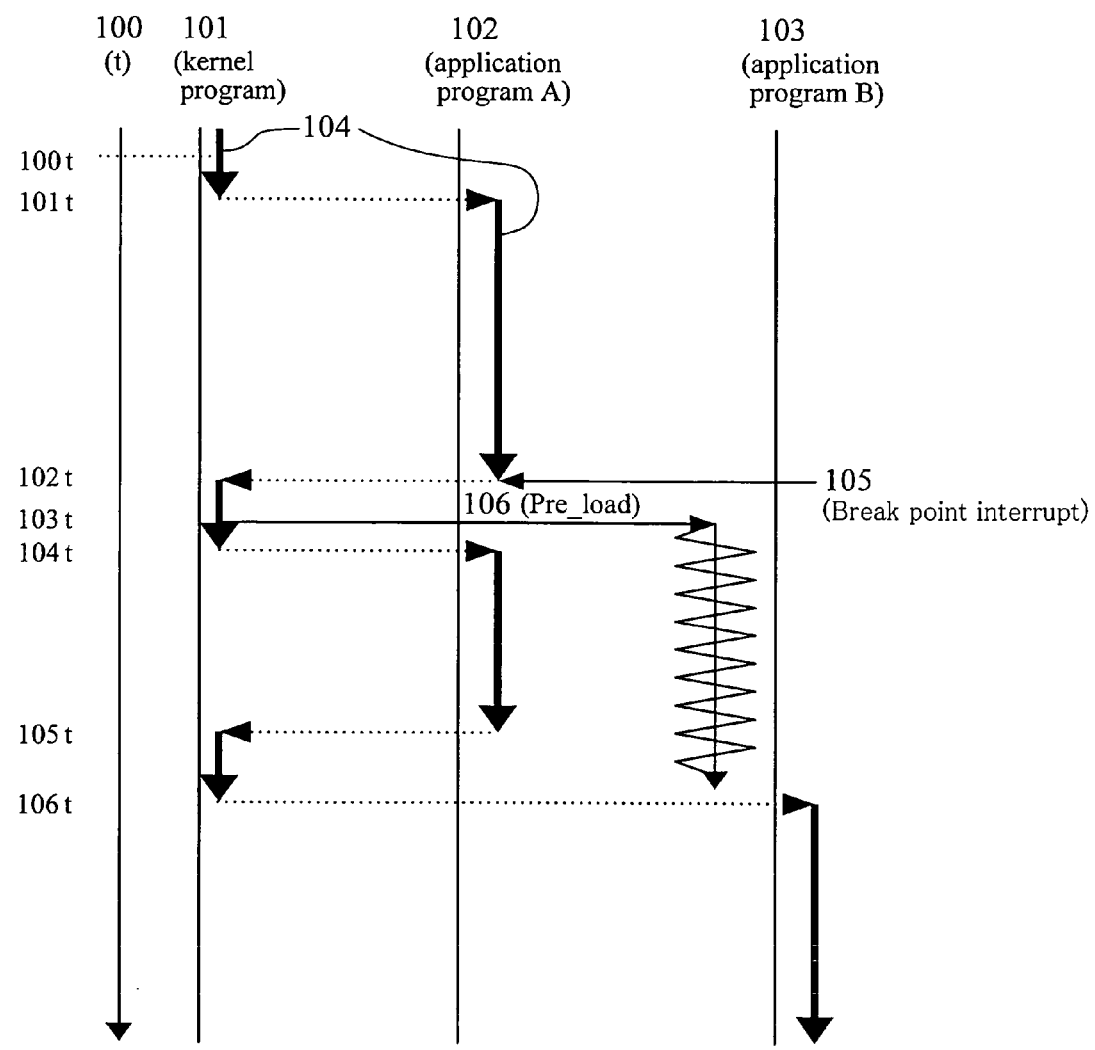
FIG. 2 is a view showing a flow of programs followed when preloading is performed in the information processing control system of Embodiment 1.

FIG. 2 shows a flow of programs followed when preloading is performed in the information processing control system shown in FIG. 1. In FIG. 2, the reference numeral 100 denotes a time flow, 101 denotes processing of a kernel program, 102 denotes processing of application program A, and 103 denotes processing of application program B. The reference numeral 104 denotes a program flow alternating between the kernel program and the application programs, 105 denotes a break point interrupt, and 106 denotes start of preloading. Time 100t denotes a time at which a preloading start timing is set in a register as a break point, 103$t$ denotes a time at which preloading is started, 101$t$ and 104$t$ denote times at which program processing shifts from the kernel program to the application program A, 102$t$ and 105$t$ denote times at which program processing shifts from the application program A to the kernel program, and 106$t$ denotes a time at which program processing shifts from the kernel program to the application program B.

Hereinafter, the flow of programs followed when preloading is performed will be described in detail. After start of the kernel program, the preloading start timing is set in a register as a break point at time 100$t$. After the setting, the program processing shifts from the kernel program to the application program A at time 101$t$, to start processing of the application program A. Once the application program A reaches a program counter value set as the break point, a break point interrupt 105 occurs, causing the processing to shift from the application program A to the kernel program at time 102$t$. On receipt of the break point interrupt 105, the kernel program starts preloading for the application program B at time 103$t$. The processing of the kernel program finishes by starting the preloading, and the processing shifts from the kernel program to the application program A at time 104$t$. When the application program A reaches an application program switch timing at time 105$t$, the processing shifts again to the kernel program. The kernel program starts the application program B at time 106$t$. By this time point, instructions in the application program B have been preloaded in the cache memory 401H. Therefore, processing of the application program B can be executed without occurrence of a miss hit interrupt.

Preloading for a different application program was described above with reference to FIG. 2. For preloading for the same application program, the processing flow is basically the same as that described above, except that the way of setting of the preloading timing is different. Only the two application programs A and B were shown in FIG. 2. It is however without mentioning that the number of application programs is not restrictive.

As described above, in Embodiment 1, in the case of preloading for the same application program, two methods may be adopted to start preloading: the method in which the timing (program counter value) at which preloading is started is set in a register as a break point at the start of the application program, and preloading is started with a break point interrupt; and the method in which a preloading start program is directly described in the application program, to start preloading. In the case of preloading for a different application program, adopted is the method in which the kernel program sets the timing at which preloading for each application program is started in its register as a break point, and preloading is started with a break point interrupt. By performing preloading by any of the methods described above, the frequency of occurrence of miss hits can be reduced, and thus real time processing while swapping instructions can be achieved.

Embodiment 2

An information processing control system of Embodiment 2, which has the same configuration as that of FIG. 1, has a feature that each application program is modularized and preloading is performed for each module as a unit.

Figure 3:
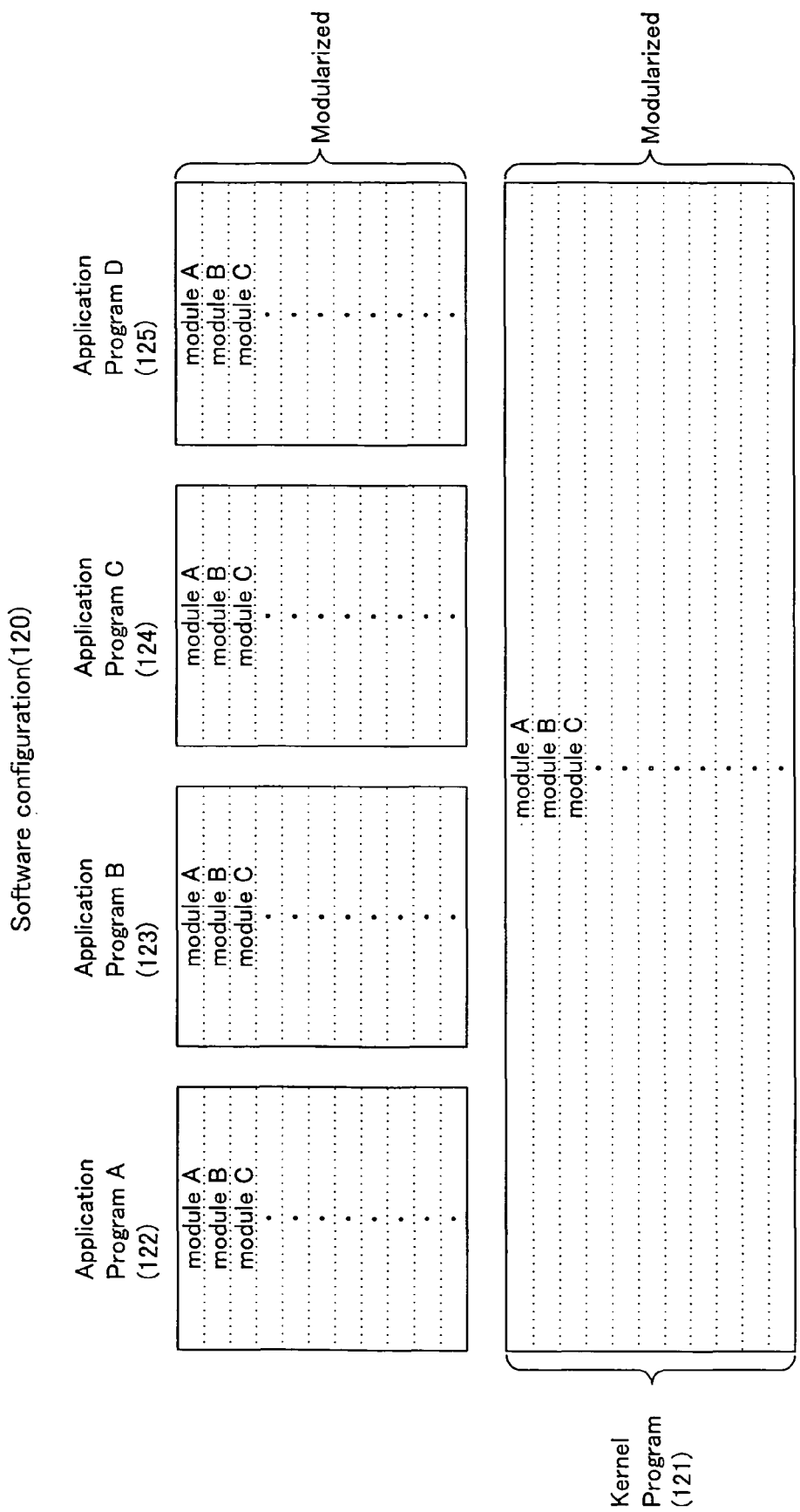
FIG. 3 is a view showing a modularized software configuration in an information processing control system of Embodiment 2 of the present invention.

In the following description, note that dividing a kernel program and an application program into unified units is called modularization. FIG. 3 shows software including a kernel program and application programs in the modularized form. In this software configuration, the application programs run on the kernel program. The software configuration, denoted by 120, includes a kernel program 121, application program A 122, application program B 123, application program C 124 and application program D 125. Although the four application programs A, B, C and D were shown in FIG. 3, it goes without mentioning that the number of application programs is not restrictive. Each of the kernel program 121 and the application programs 122 to 125 is modularized, and arranged to perform preloading for each modularized unit.

Figure 4:
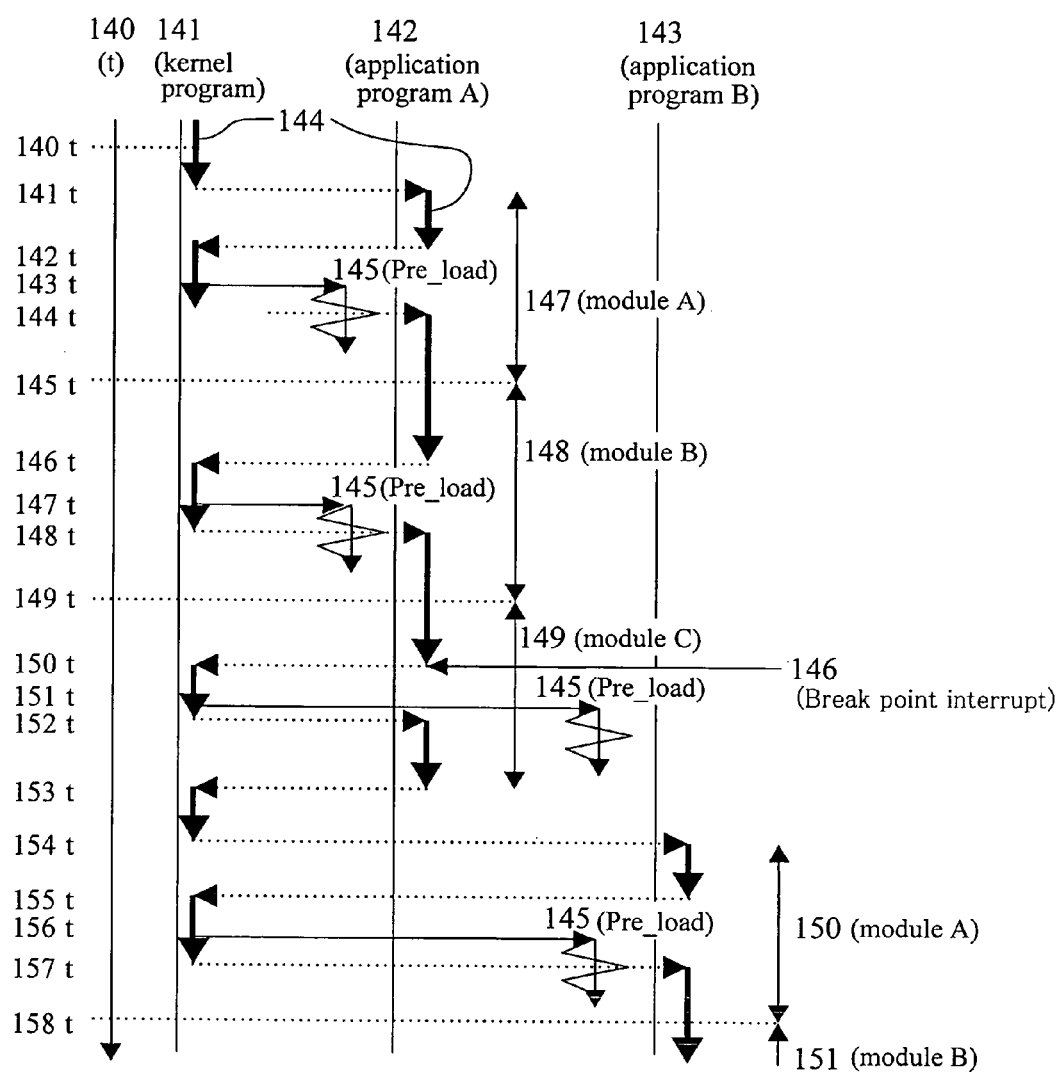
FIG. 4 is a view showing a flow of programs followed when module-unit preloading is performed in the information processing control system of Embodiment 2.

FIG. 4 shows a flow of programs followed when the modularized programs are preloaded in Embodiment 2. In the case of preloading for the same application program, two methods may be adopted to start preloading: the method in which a break point is set to start the preloading; and the method in which a preloading start program is directly described in the application program, to start the preloading. Note that the latter method is adopted in the following discussion with reference to FIG. 4. The reference numeral 140 denotes a time flow, 141 denotes processing of the kernel program, 142 denotes processing of the application program A, and 143 denotes processing of the application program B. The reference numeral 144 denotes a program flow alternating between the kernel program and the application programs, 145 denotes start of preloading, and 146 denotes a break point interrupt. The reference numerals 147, 148 and 149 respectively denote time sections during which module A, module B and module C of the application program A are processed, and the reference numerals 150 and 151 respectively denote time sections during which module A and module B of the application program B are processed. Time 140$t$ denotes a time at which a preloading start timing is set in a register as a break point. Times 143$t$, 147$t$, 151$t$ and 156$t$ denote times at which preloading is started. Times 141$t$, 144$t$, 148$t$ and 152$t$ denote times at which program processing shifts from the kernel program to the application program A, 142$t$, 146$t$, 150$t$ and 153$t$ denote times at which program processing shifts from the application program A to the kernel program, 154$t$ and 157$t$ denote times at which program processing shifts from the kernel program to the application program B, and 155$t$ denotes a time at which program processing shifts from the application program B to the kernel program. Time 145$t$ denotes a time at which processing shifts from the module A to the module B in the application program A, 149$t$ denotes a time at which processing shifts from the module B to the module C in the application program A, and 158*t* denotes a time at which processing shifts from the module A to the module B in the application program B.

Hereinafter, the flow of programs followed when module-unit preloading is performed will be described in detail. After start of the kernel program, the preloading start timing for the application program B is set in a register as a break point at time 140*t*. After the setting, the program processing shifts from the kernel program to the application program A at time 141*t*, to start processing of the application program A. Thereafter, the processing shifts from the application program A to the kernel program at the time point (time 142*t*) at which an instruction for start of preloading for the module B, described in the module A of the application program A, is issued. The preloading for the module B is started at time 143*t*. The processing of the kernel program finishes by starting the preloading, and the processing shifts from the kernel program to the module A of the application program A at time 144*t*. At time 145*t*, the processing of the module A of the application program A is terminated, and processing of the module B is started. The processing shifts from the application program A to the kernel program at the time point (time 146*t*) at which an instruction for start of preloading for the module C, described in the module B of the application program A, is issued. The preloading for the module C is started at time 147*t*. The processing of the kernel program finishes by starting the preloading, and the processing shifts from the kernel program to the module B of the application program A at time 148*t*. At time 149*t*, the processing of the module B of the application program A is terminated, and processing of the module C is started. An break point interrupt 146 occurs at the time point at which the module C of the application program A reaches the program counter value set as the break point, forcing shift of the processing from the application program A to the kernel program at time 150*t*. On receipt of the break point interrupt 146, the kernel program starts preloading for the application program B at time 151*t*. The processing of the kernel program finishes by starting the preloading, and the processing shifts from the kernel program to the application program A at time 152*t*. When the processing of the application program A reaches a program switch timing at time 153*t*, the processing shifts again to the kernel program. The kernel program starts the application program B at time 154*t*, and thereafter processing of the application program B is performed in a similar manner. Necessary instructions have been preloaded in the cache memory by the time of start of the processing of each of the modules B and C of the application program A and the module A of the application program B. Therefore, the processing of the application programs can be executed without causing occurrence of a miss hit interrupt.

Although not mentioned in the above description, some modules may include instructions for start of preloading for many modules, while other modules may not include such an instruction at all.

Although only the two application programs A and B and the three modules A, B and C were shown in FIG. 4, it goes without mentioning that the number of application programs and the number of modules are not restrictive.

As described above, in Embodiment 2, each program is modularized and preloading is performed for each module as a unit. This enhances the prediction precision for start of preloading, compared with the case involving no modularization, and thus reduces the frequency of occurrence of miss hits. Moreover, since the DMA time required for one time of preloading can be shortened, the miss hit penalty can be reduced even in an event of occurrence of miss hits. Thus, in Embodiment 2, real time processing while swapping instructions can be achieved, and further, higher-speed real time processing than in Embodiment 1 can be handled.

Embodiment 3

An information processing control system of Embodiment 3, which has the same configuration as that of FIG. 1, has a feature that module-unit preloading is performed at appropriate times by an appropriate number of times by using information in a cache table register in the cache controller 402H and information on the preloading execution status.

Figure 5:
FIG. 5 is a flowchart followed when module-unit preloading is performed in an information processing control system of Embodiment 3 of the present invention.

FIG. 5 is a flowchart followed when preloading is performed for each module of an application program in Embodiment 3. In this flowchart, whether or not preloading should be started is determined based on the status in the cache controller 402H (in particular, the preloading execution status). If start of preloading is determined in step 160, the process proceeds to step 162 for the kernel program via step 161 for module A of an application program. If there is no start of preloading in step 160, processing of the module A is executed in step 166, and then, with no preloading performed, the processing shifts to module B in step 167. In step 162, whether or not a tag address agreeing with the program counter (PC) value with which preloading is to be performed exists in the cache table register is determined. If no such tag address exists, the process proceeds to step 164 to start the preloading. If such a tag address exists, the process proceeds to step 163, to determine whether or not the instruction satisfying the condition in step 162 is under preloading. If not under preloading, the process proceeds to step 164 to start the preloading. If under preloading, nothing is executed and the process proceeds to step 165. The process also proceeds to step 165 after completion of step 164. In step 165, whether or not all of events of start of preloading have been completed is determined. If not yet completed, the process returns to step 162 to repeat the processing described above. If completed, the process proceeds to step 166 to perform the remaining processing of the module A, and then shifts to the module B in step 167.

As described above, in Embodiment 3, module-unit preloading can be performed at appropriate times by an appropriate number of times by using information in the cache table register in the cache controller 402H and information on the preloading execution status.

Embodiment 4

An information processing control system of Embodiment 4, which has the same configuration as that of FIG. 1, has a feature that a miss hit interrupt and a DMA done interrupt are provided as an interrupt means for the processor 403H, and thus program execution can be done while switching a program to another one once an instruction miss hit occurs.

Figure 6:
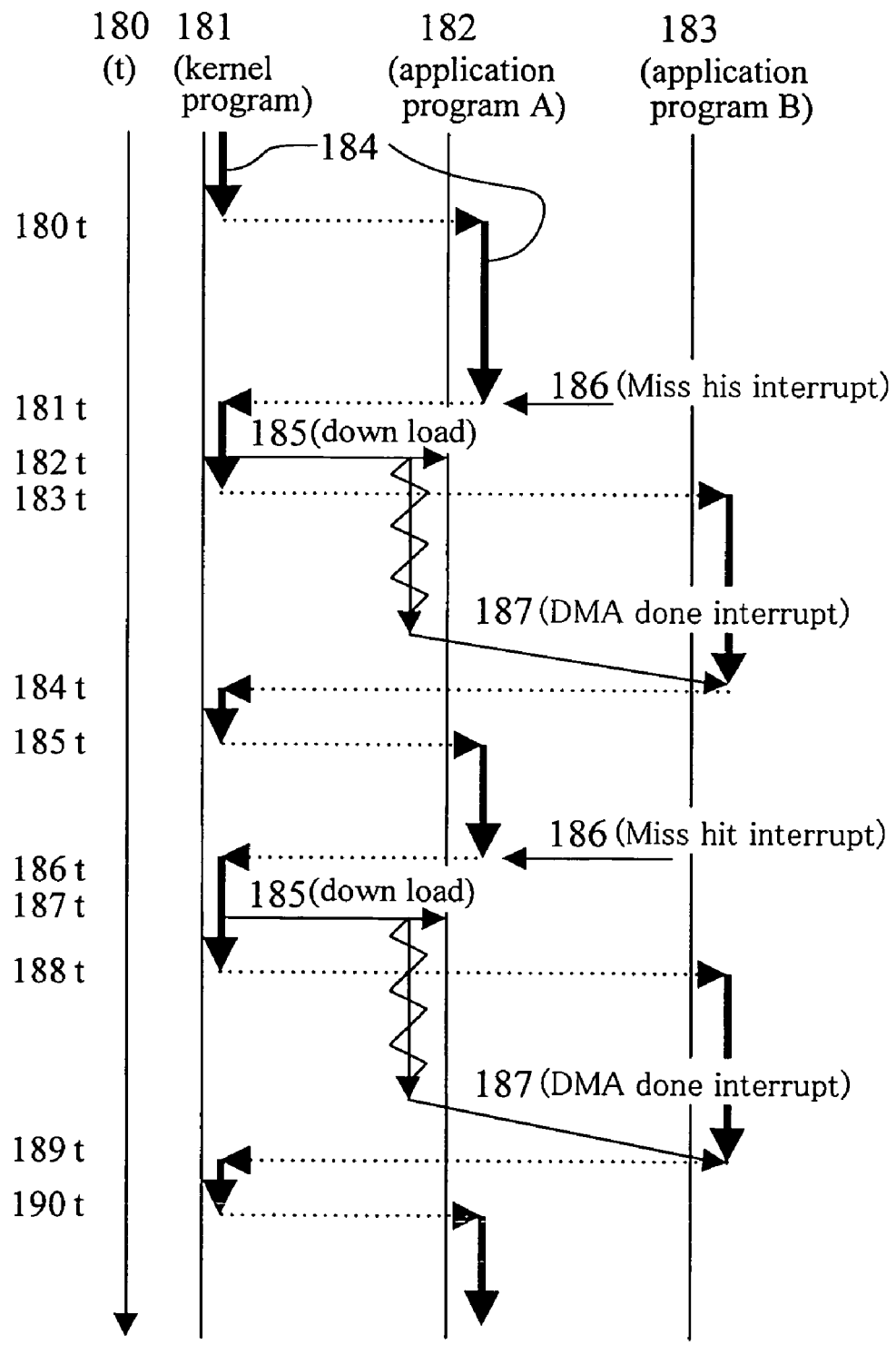
FIG. 6 is a view showing a flow of programs followed when program execution is done while switching an application program to another one once a miss hit occurs, in an information processing control system of Embodiment 4 of the present invention.

FIG. 6 shows a flow of programs followed when program execution is done while switching an application program to another one once an instruction miss hit occurs, using a miss hit interrupt and a DMA done interrupt, in Embodiment 4. The reference numeral 180 denotes a time flow, 181 denotes processing of a kernel program, 182 denotes processing of application program A, and 183 denotes processing of application program B. The reference numeral 184 denotes a program flow alternating between the kernel program and the application programs, 185 denotes start of downloading, 186 denotes a miss hit interrupt, and 187 denotes a DMA done interrupt, which occurs upon completion of downloading. Times 180*t*, 185*t* and 190*t* denote times at which program processing shifts from the kernel program to the application program A, 181*t* and 186*t* denote times at which program processing shifts from the application program A to the kernel program, 183*t* and 188*t* denote times at which program processing shifts from the kernel program to the application program B, and 184*t* and 189*t* denote times at which program processing shifts from the application program B to the kernel program.

Hereinafter, the flow of programs followed when program execution is done while switching an application program to another one at occurrence of an instruction miss hit. After start of the kernel program, the program processing shifts from the kernel program to the application program A at time 180*t*, to start processing of the application program A. When there is no necessary instruction left in the cache memory 401H, a miss hit interrupt occurs. Once a miss hit interrupt 186 occurs at time 181*t*, the processing shifts from the application program A to the kernel program. On receipt of the miss hit interrupt, the kernel program starts downloading of instructions for the application program A at time 182t. If detecting a standby application program, the kernel program switches the application program to the standby application program. Assuming that the application program B is in the standby state, the kernel program permits start of the application program B (time 183*t*). The downloading is underway during the execution of the application program B. Once the downloading is completed, a DMA done interrupt 187 is issued, to shift the processing from the application program B to the kernel program (time 184*t*). When the DMA done interrupt 187 is for the application program A, the kernel program restarts the application program A from the instruction at which the miss hit interrupt 186 has occurred (time 185*t*). As for the DMA done interrupt 187, assume that an interrupt factor is given for each application program or each module.

In FIG. 6, switching between two application programs was described. Basically the same processing as that described above will also apply to the case having a plurality of application programs in which an application program is switched to a second application program at occurrence of a miss hit interrupt, and then another miss hit interrupt occurs in the second application program. Although only the two application programs A and B were shown in FIG. 6, it goes without mentioning that the number of application programs is not restrictive.

As described above, in Embodiment 4, in which the miss hit interrupt 186 and the DMA done interrupt 187 are provided as an interrupt means for the processor 403H, program execution can be done while switching an application program to another one once an instruction miss hit occurs. In particular, as for the DMA done interrupt 187, an interrupt factor is given for each application program or each module. Therefore, even when an application program is switched to another application program upon occurrence of a miss hit interrupt 186, the original application program can be resumed once a DMA done interrupt 187 occurs. By this switch between application programs at occurrence of a miss hit interrupt, the miss hit penalty, generated with the downloading of a necessary instruction from the main memory 400H to the cache memory 401H, can be concealed, and this increases the serviceability ratio of the processor.

Embodiment 5

An information processing control system of Embodiment 5, which has the same configuration as that of FIG. 1, has a feature that whether or not downloading should be started is determined by using information in the cache table register in the cache controller 402H and information on the preloading execution status.

Figure 7:
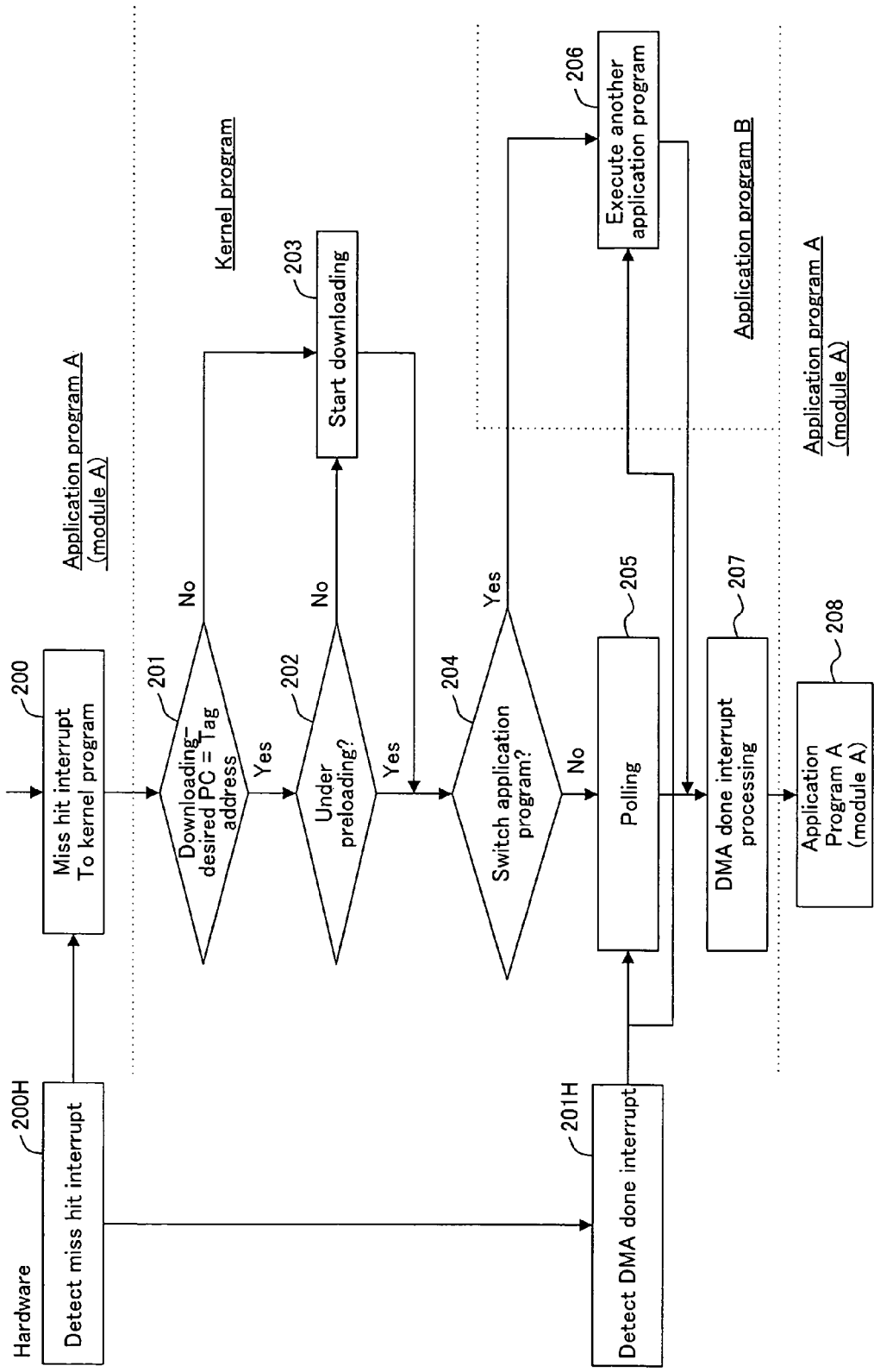
FIG. 7 is a flowchart followed when program execution is done while switching an application program to another one once a miss hit occurs, in an information processing control system of Embodiment 5 of the present invention.

FIG. 7 is a flowchart followed when program execution is done while switching an application program to another one once an instruction miss hit occurs in Embodiment 5. In this flowchart, whether or not downloading should be started is determined from the status in the cache controller 402H (in particular, the preloading execution status). Also, whether or not a standby application program exists is determined when a miss hit occurs, to switch the application program. In FIG. 7, the reference numerals 200H and 201H denote hardware processing. For example, if hardware detects a miss hit interrupt in 200H during processing of module A of application program A, the processing shifts from the module A of the application program A in step 200 to a kernel program, with the process proceeding to step 201. In step 201, whether or not a tag address agreeing with the program counter (PC) value with which preloading is to be performed exists in the cache table register is determined. If no such tag address exists, the process proceeds to step 203 to start the downloading. If such a tag address exists, the process proceeds to step 202, to determine whether or not the instruction satisfying the condition in step 202 is under preloading. If not under preloading, the process proceeds to step 203 to start the downloading. If under preloading, nothing is executed and the process proceeds to step 204. The process also proceeds to step 204 after the start of downloading in step 203. In step 204, whether or not a standby application program exists is determined. If existing, the application program is switched and the standby application program is executed in step 206. If not existing, polling is done until completion of the downloading. Once the downloading is completed and hardware detects a DMA done interrupt in 201H, the processing shifts from step 205 or 206 to processing of the DMA done interrupt in step 207 in the kernel program. After the processing of the DMA done interrupt in step 207, the original processing of the module A of the application program A is resumed, to restart the program from the instruction at which the miss hit interrupt has occurred.

As described above, in Embodiment 5, whether or not downloading should be started is determined by using information in the cache table register in the cache controller 402H and information on the preloading execution status. Also, after the start of preloading or downloading, whether or not a standby application program exists is determined, to switch the application program. Thus, the miss hit penalty generated by performing preloading or downloading can be concealed.

Embodiment 6

An information processing control system of Embodiment 6, which has the same configuration as that of FIG. 1, has a feature that an arrangement is made so that the DMA execution status and the miss hit occurrence status are available for each module.

Figure 8:
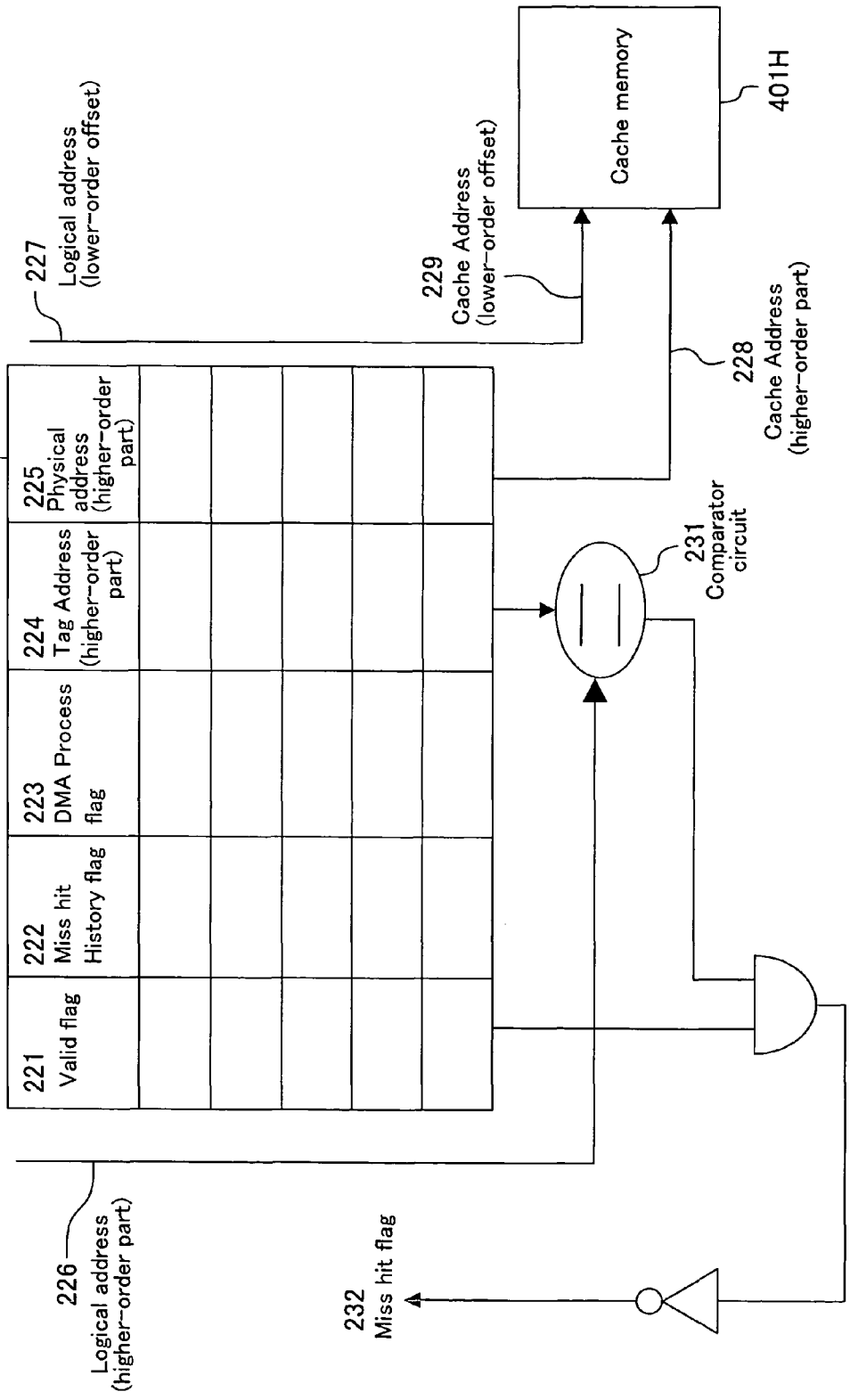
FIG. 8 is a block diagram showing a configuration of a cache table register and a cache memory in an information processing control system of Embodiment 6 of the present invention.

FIG. 8 is a block diagram of an internal configuration of the cache controller 402H in Embodiment 6. In FIG. 8, the reference numeral 220 denotes a cache table register showing the correspondence between the logical address in a program and the physical address. The reference numeral 224 denotes a tag address, 225 denotes a physical address, and 221 denotes a valid flag indicating whether the correspondence between the tag address 224 and the physical address 225 is valid or invalid. The cache table register 220 is given as a module-unit correspondence table. The reference numeral 222 denotes a miss hit history flag indicating whether or not a miss hit has occurred in a module corresponding to the tag address 224 and the physical address 225, and 223 denotes a DMA process flag indicating whether or not DMA for preloading or downloading is underway in a module corresponding to the tag address 224 and the physical address 225. (Hereinafter, each set of the tag address, the physical address, the valid flag, the miss hit history flag and the DMA process flag is called a block. The cache table register 220 is composed of a plurality of such blocks.) The reference numeral 226 denotes the higher-order part of the logical address in a program, and 227 denotes the lower-order part of the logical address in a program. The reference numeral 228 denotes the higher-order part of the cache address, and 229 denotes the lower-order part of the cache address, which is the same as the lower-order part 227 of the logical address. The reference numeral 231 denotes a comparator circuit, and 232 denotes a miss hit flag with which a miss hit interrupt occurs. The cache table register 220 is configured to allow write from/read into a program. It is also arranged so that the valid flag 221 is set at the time of completion of DMA, while the DMA process flag 223 is reset at the time of completion of DMA.

Hereinafter, the operation of the circuit described above will be described. In this circuit, if the higher-order part 226 of the logical address in a program and the tag address 224 are found identical to each other by comparison with the comparator circuit 231 and also the valid flag 221 is valid, the higher-order part of the physical address 225 is sent to the cache memory 401H as the higher-order part 228 of the cache address, together with the lower-order part 227 of the logical address in the program as the lower-order part 229 of the cache address. If there is no item in the cache table register 220 satisfying that the higher-order part 226 of the logical address in a program and the tag address 224 are found identical to each other by comparison with the comparator circuit 231 and also the valid flag 221 is valid, the miss hit flag 232 goes active, causing occurrence of a miss hit interrupt. By setting the miss hit history flag 222 at occurrence of a miss hit interrupt, where in the cache table register the miss hit interrupt has occurred is made clear. Moreover, since the DMA process flag 223 is automatically reset upon completion of DMA, the DMA execution status for each module is made clear by merely setting the DMA process flag 223 at the start of DMA for preloading or downloading.

As described above, in Embodiment 6, preloading can be done for each module since the DMA execution status and the miss hit occurrence status are available for each module. Also, program execution can be done while switching an application program to another one once a miss hit interrupt occurs. Thus, an information processing control system that achieves real time processing while swapping instructions can be constructed.

Embodiment 7

Figure 9:
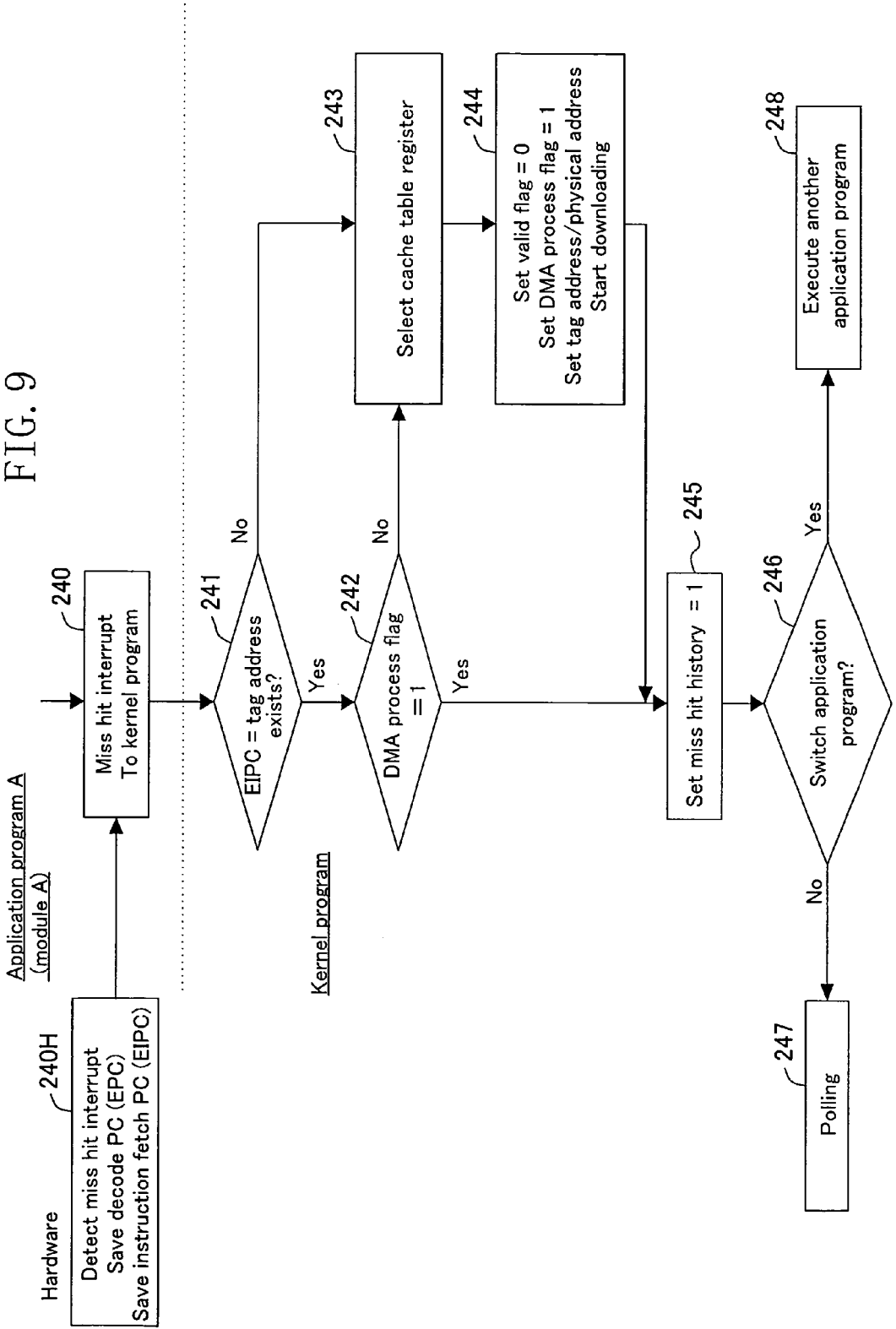
FIG. 9 is a flowchart followed when miss hit interrupt processing is performed in an information processing control system of Embodiment 7 of the present invention.

An information processing control system of Embodiment 7 is one developed from Embodiment 6. In this system, the values of the instruction fetch program counter (hereinafter, called EIPC) and the instruction decode program counter (hereinafter, called EPC) at the time of occurrence of a miss hit interrupt are automatically saved when the miss hit interrupt occurs. FIG. 9 is a flowchart showing miss hit interrupt processing performed using the EIPC value and the DMA process flag and the information processing control system of Embodiment 6 shown in FIG. 8. In FIG. 9, the reference numeral 240H denotes processing of hardware (the processor 403H and the cache controller 402H). If the hardware detects a miss hit interrupt in 240H during execution of module A of application program A, the EIPC and EPC values are automatically saved, and the processing shifts from the module A of the application program A in step 240 to a kernel program, with the process proceeding to step 241. In step 241, whether or not a tag address agreeing with the EIPC value exists in the cache table register is determined. If no such tag address exists, the process proceeds to step 243 to select a block in the cache table register arbitrarily. If such a tag address exists, the process proceeds to step 242, to determine whether or not the DMA process flag is "1" in the block satisfying the condition in step 241. If the DMA process flag is not "1", indicating that preloading is not underway, the process proceeds to step 243 for arbitrary selection of a block in the cache table register. If the DMA process flag is "1", indicating that preloading is underway, nothing is executed and the process proceeds to step 245. After the arbitrary selection in the cache table register in step 243, the process proceeds to step 244. In step 244, the valid flag and the DMA process flag of the selected block are set at "0" and "1", respectively, the tag address and the physical address are set, and downloading is started. The process then proceeds to step 245. In step 245, the miss hit history of the block satisfying the condition in step 242 for the case of coming from step 242, or the miss hit history of the block selected in step 243 for the case of coming from step 244, is set at "1". The process then proceeds to step 246, where whether or not a standby application program exists is determined. If existing, the application program is switched and the standby application program is executed in step 248. If not existing, polling is done until completion of the downloading in step 247 in the kernel program.

As described above, in Embodiment 7, in which miss hit interrupt processing is performed using the EIPC value and the DMA process flag and the information processing control system of Embodiment 6, it is possible to handle both the miss hit interrupt occurring under execution of preloading and the miss hit interrupt occurring under no execution of preloading.

Embodiment 8

Figure 10:
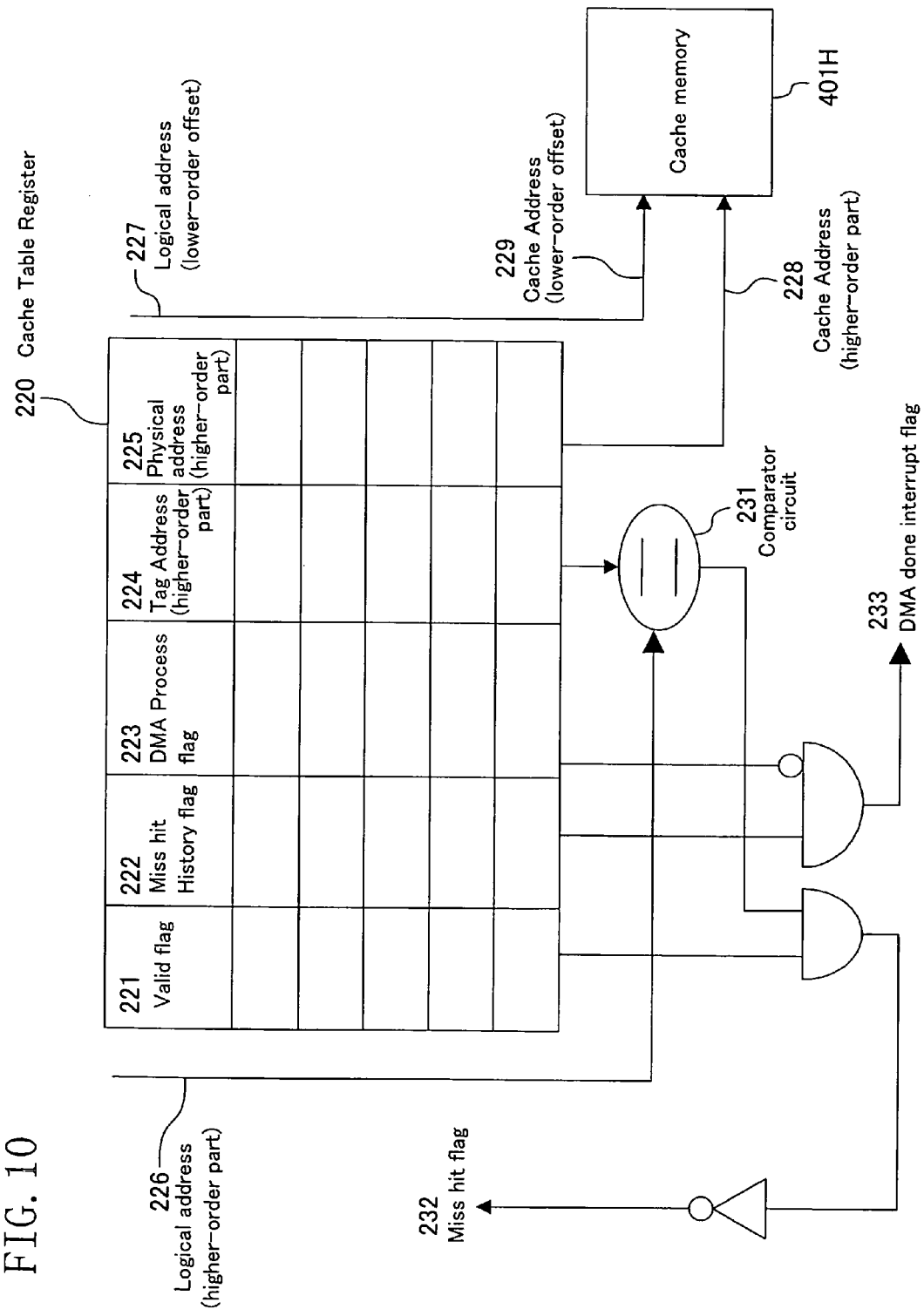
FIG. 10 is a block diagram showing a configuration of a cache table register and a cache memory in an information processing control system of Embodiment 8 of the present invention, in which a DMA done interrupt is issued.

An information processing control system of Embodiment 8 has the same configuration as that of FIG. 1. FIG. 10 is a block diagram of an internal configuration of the cache controller 402H in Embodiment 8. In FIG. 10, the same or analogous components as or to those in FIG. 8 are denoted by the same reference numerals. The reference numeral 233 denotes a DMA done interrupt flag. The DMA done interrupt flag 233 is set only when DMA has been completed for the block of which the miss hit history flag 222 is "1". That is, when a miss hit interrupt occurs the DMA process flag 223 is set at "1", then DMA for preloading or downloading is started, and the miss hit history flag 222 is set at "1". When a miss hit interrupt does not occur, the DMA process flag 223 is set at "1", then DMA for preloading or downloading is started, and the miss hit history flag 222 is set at "0". Since the DMA process flag 223 is structured to be automatically reset to "0" at the completion of the DMA, a DMA done interrupt occurs only when a miss hit interrupt occurs.

As described above, in Embodiment 8, the DMA done interrupt does not occur every time DMA is completed, in a situation where a miss hit interrupt does not occur. Therefore, the program switch loss that occurs every completion of DMA is reduced, and thus reduction of the processing efficiency of the processor can be minimized. In addition, if it is not desirable to have occurrence of a DMA done interrupt even after occurrence of a miss hit interrupt, for example, the miss hit history flag may be kept at "0", to prevent a DMA done interrupt from occurring. In this way, occurrence of a DMA done interrupt can be controlled.

Embodiment 9

Figure 11:
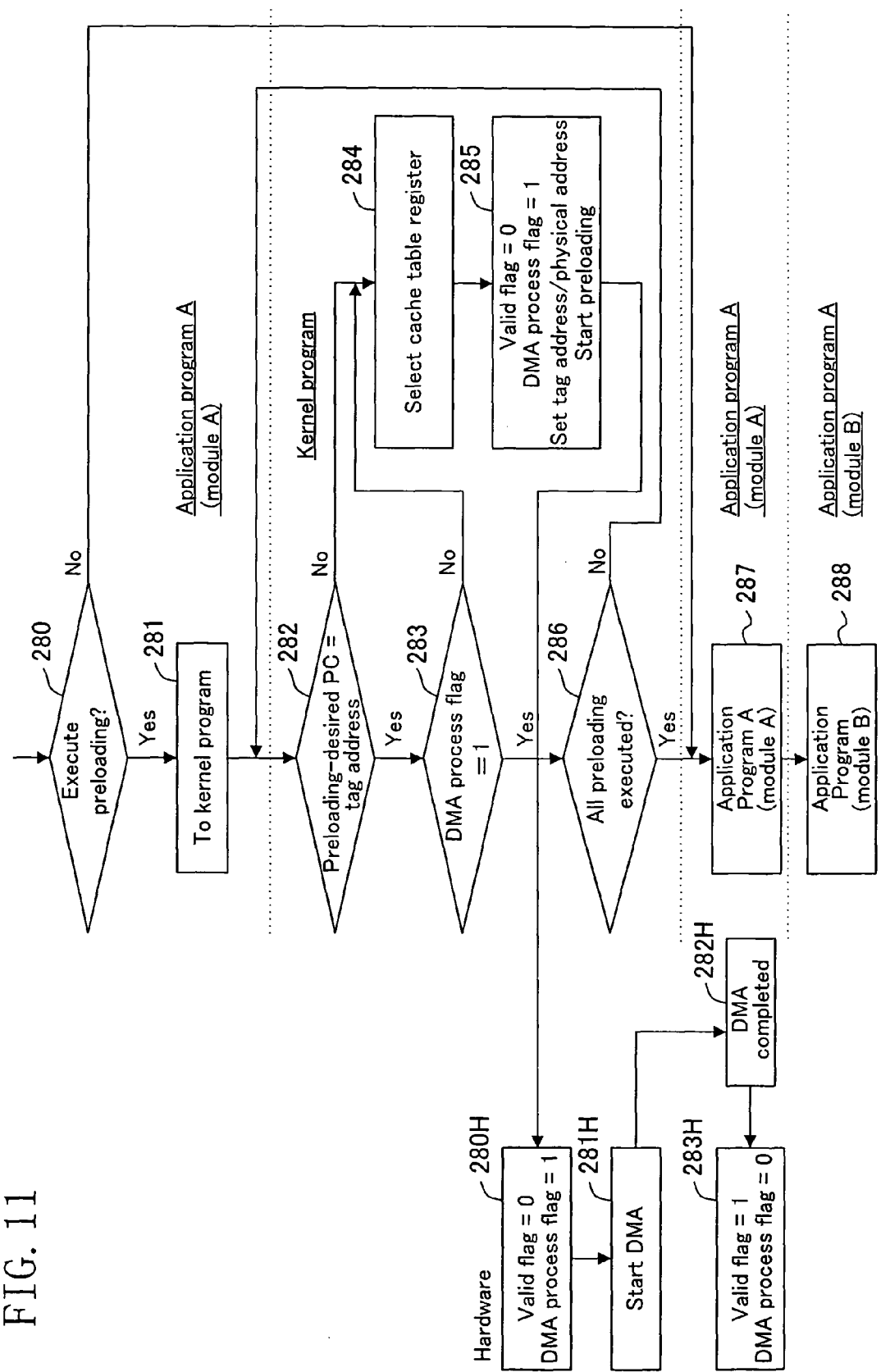
FIG. 11 is a flowchart followed when module-unit preloading is performed in an information processing control system of Embodiment 9 of the present invention.

An information processing control system of Embodiment 9 is an example of application of Embodiment 8. FIG. 11 is a flowchart followed when preloading is performed for each module of an application program in the information processing control system of Embodiment 8. If preloading is started in step 280, the process proceeds to step 282 for the kernel program via step 281 for module A of application program A. If start of preloading does not exist in the module A, the module A is processed in step 287, and then, without execution of preloading, the processing proceeds to module B in step 288. In step 282, whether or not a tag address agreeing with the program counter (PC) value at which preloading is to be performed exists in the cache table register 220 is determined. If no such tag address exists, the process proceeds to step 284 to select a block in the cache table register 220 arbitrarily. If such a tag address exists, the process proceeds to step 283, to determine whether or not the DMA process flag 223 is "1" in the block satisfying the condition in step 282. If the DMA process flag 223 is not "1", indicating that preloading is not underway, the process proceeds to step 284 for arbitrary selection of a block in the cache table register 220. If the DMA process flag 223 is "1", indicating that preloading is underway, nothing is executed and the process proceeds to step 286. After the arbitrary selection in the cache table register 220 in step 284, the process proceeds to step 285. In step 285, the valid flag 221 and the DMA process flag 223 of the selected block are set at "0" and "1", respectively, the tag address 224 and the physical address 225 are set, and downloading is started. The process then proceeds to step 286. In step 286, whether or not all of events of start of preloading have been completed is determined. If not yet completed, the process returns to step 282 to repeat the processing described above. If completed, the process proceeds to step 287 to perform the remaining processing of the module A, and then proceeds to step 288 to perform processing of module B. In the hardware, at the time of completion of the processing in step 285, the valid flag 221 is set at "0" and the DMA process flag 223 is set at "1" in 280H, and DMA is started in 281H. Once the DMA is completed in 282H, the valid flag 221 and the DMA process flag 223 are automatically set at "1" and "0", respectively, in 283H.

As described above, in Embodiment 9, the preloading execution status is determined from the DMA process flag 223 using the information processing control system of Embodiment 8, and thus module-unit preloading can be performed at appropriate times by an appropriate number of times.

Embodiment 10

Figure 12:
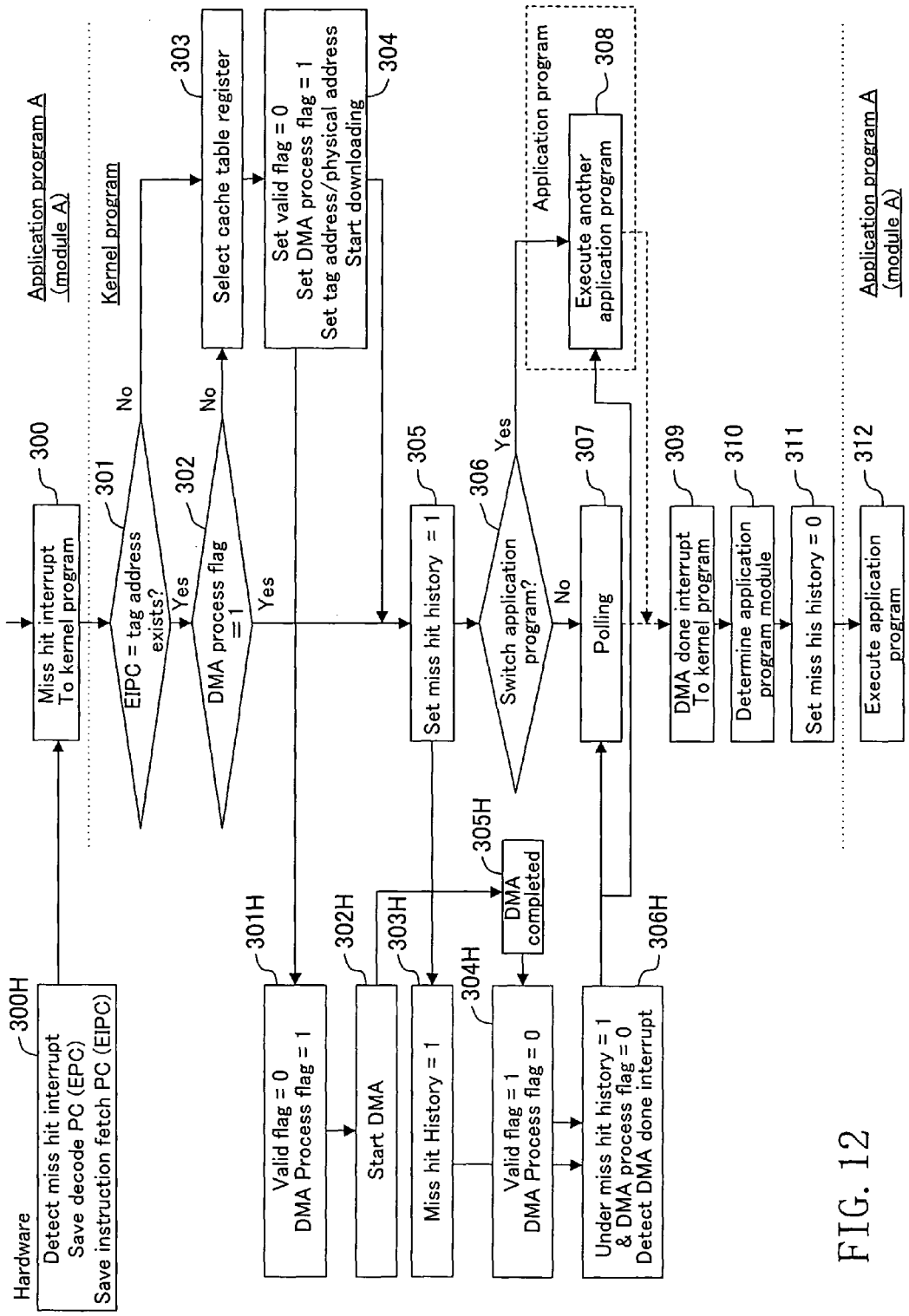
FIG. 12 is a flowchart followed when program execution is done while switching an application program to another one once a miss hit occurs, in an information processing control system of Embodiment 10 of the present invention.

An information processing control system of Embodiment 10 of the present invention has features of the information processing control system of Embodiment 7 shown in FIG. 9 and the information processing control system of Embodiment 8 shown in FIG. 10, in which program execution is done while switching an application program to another one once a miss hit interrupt occurs. FIG. 12 is a flowchart showing the processing in Embodiment 10. In FIG. 12, the reference numerals 300H, 301H, 302H, 303H, 304H, 305H and 306H denote processing of hardware. If the hardware detects a miss hit interrupt in 300H during execution of module A of application program A, the EIPC and EPC values are automatically saved, and the processing shifts from the module A of the application program A in step 300 to a kernel program, with the process proceeding to step 301. In step 301, whether or not a tag address 224 agreeing with the EIPC value exists in the cache table register 220 is determined. If no such tag address exists, the process proceeds to step 303 to select a block in the cache table register 220 arbitrarily. If such a tag address exists, the process proceeds to step 302, to determine whether or not the DMA process flag 223 is "1" in the block satisfying the condition in step 301. If the DMA process flag is not "1", indicating that preloading is not underway, the process proceeds to step 303 for arbitrary selection of a block in the cache table register 220. If the DMA process flag 223 is "1", indicating that preloading is underway, nothing is executed and the process proceeds to step 305. After the arbitrary selection in the cache table register 220 in step 303, the process proceeds to step 304. In step 304, the valid flag 221 and the DMA process flag 223 of the selected block are set at "0" and "1", respectively, the tag address 224 and the physical address 225 are set, and downloading is started. The process then proceeds to step 305. In step 305, the miss hit history flag 222 of the block satisfying the condition in step 302 for the case of coming from step 302, or the miss hit history flag 222 of the block selected in step 303 for the case of coming from step 304, is set at "1". The process then proceeds to step 306, where whether or not a standby application program exists is determined. If existing, the application program is switched and the standby application program is executed in step 308. If not existing, polling is done until completion of the downloading in step 307 in the kernel program. In the hardware, at the time of completion of the processing in step 304, the valid flag 221 is set at "0" and the DMA process flag 223 is set at "1" in 301H, and DMA is started in 302H.

At the time of completion of the processing in step 305, the miss hit history flag 222 is set at "1" in 303H. Once the DMA is completed in 305H, the valid flag 221 and the DMA process flag 223 are automatically set at "1" and "0", respectively, in 304H. When the DMA process flag 223 becomes "0" while the miss hit history flag 222 is "1", a DMA done interrupt is detected, and the processing shifts from step 307 or step 308 to a DMA done interrupt routine in step 309 in the kernel program. Thereafter, the module of the current application program to which the execution has been shifted is determined in step 310, the miss hit history flag 222 is set at "0" in step 311, and then the processing shifts to the module of the application program for which the DMA done interrupt has been issued.

As described above, in Embodiment 10, since programs are controlled using the features of the information processing control system of Embodiment 7 and the information processing control system of Embodiment 8, program execution while switching the application program is possible. Therefore, the miss hit penalty generated with execution of preloading or downloading can be concealed. In addition, since a DMA done interrupt occurs only when all necessary instructions for each module have been prepared in the cache memory, an application program in which a miss hit interrupt has occurred can be resumed in a shorter time.

Embodiment 11

Figure 13:
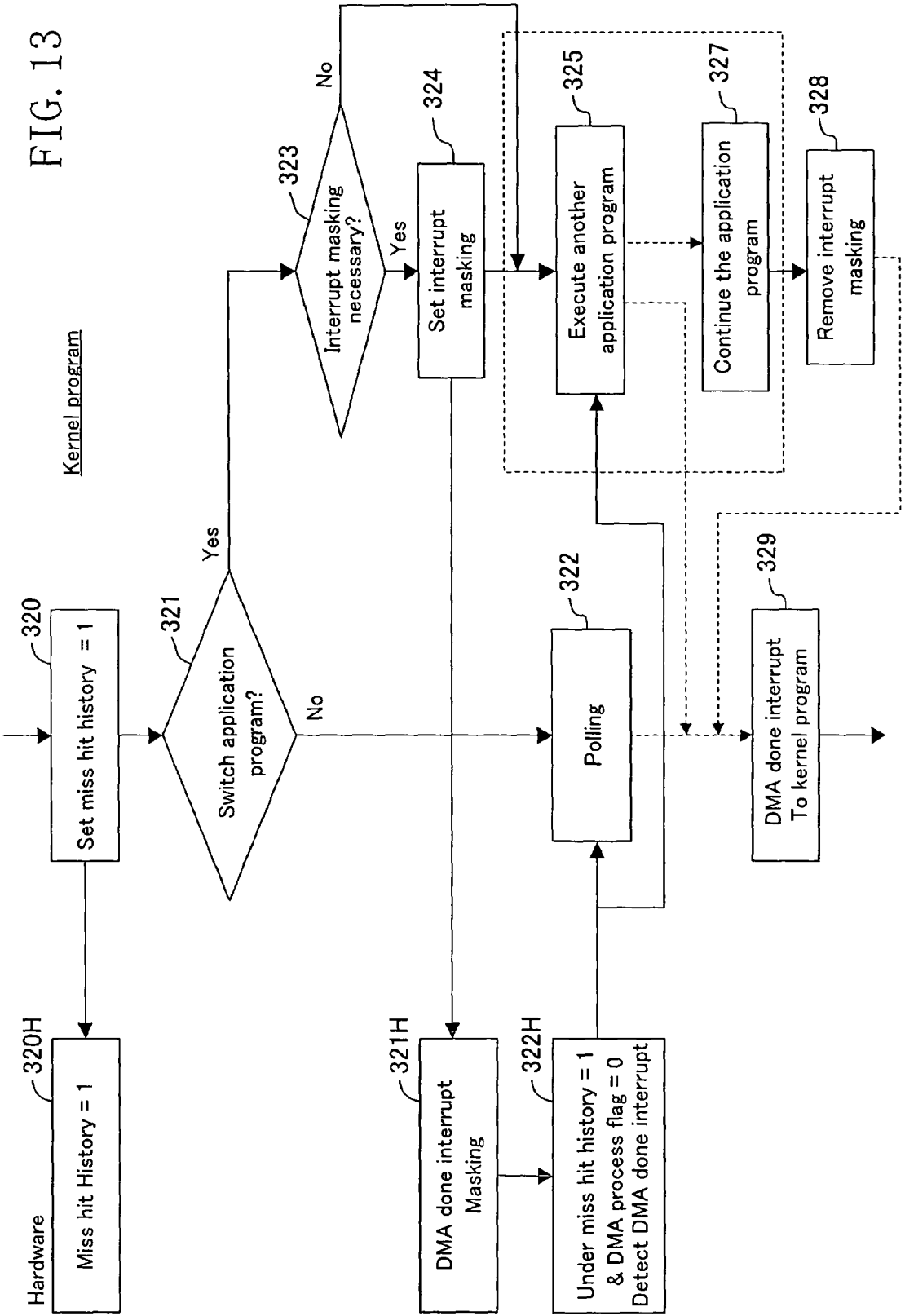
FIG. 13 is a flowchart followed when DMA done interrupt masking is performed in an information processing control system of Embodiment 11 of the present invention.

An information processing control system of Embodiment 11 has a DMA done interrupt mask mechanism in addition to the information processing control system of Embodiment 6, to enable masking of a DMA done interrupt. The mask mechanism of this information processing control system, which masks a DMA done interrupt occurring for each module, does not eliminate the interrupt factor itself, but holds the interrupt factor, so that the interrupt factor can be resumed once the interrupt masking is removed to enable occurrence of the interrupt. FIG. 13 is a flowchart followed when a DMA done interrupt is masked with the DMA done interrupt mask mechanism and the information processing control system of Embodiment 6. This flowchart shows processing to be performed after a miss hit interrupt occurs. The reference numerals 320H, 321H and 322H denote processing of hardware. After downloading is started subsequent to the occurrence of a miss hit interrupt, the miss hit history flag is set at "1" in step 320. The process then proceeds to step 321. In step 321, whether or not a standby application program exists is determined. If existing, the application program is switched, and the process proceeds to step 323. If not existing, polling is done until completion of the downloading in step 322 in the kernel program. In step 323, whether or not interrupt masking is necessary is determined. If necessary, interrupt masking is set in step 324, and then another application program is executed in step 325. If not necessary, the process directly proceeds to step 325 to execute another application program. In the hardware, at the completion of the processing in step 320, the miss hit history flag is set at "1" in 320H. At the completion of the processing in step 324, DMA done interrupt masking is set in 321H. Thereafter, in 322H, a DMA done interrupt is detected. In step 322, the DMA done interrupt occurs at the detection of the DMA done interrupt, and the process proceeds to step 329 for processing of the DMA done interrupt. Also, in step 325, in the case that no DMA done interrupt masking has been set, the DMA done interrupt occurs at the detection of the DMA done interrupt, and the process proceeds to step 329 for processing of the DMA done interrupt. In the case that the DMA done interrupt masking has been set, no DMA done interrupt occurs even when the DMA done interrupt is detected, and the process proceeds to step 327 to continue the processing of the current application program. Once the interrupt masking is removed later in step 328, the DMA done interrupt occurs, and the process proceeds to step 329 for processing of the DMA done interrupt.

As described above, in Embodiment 11, a DMA done interrupt issued after a miss hit interrupt may be masked with its interrupt factor left unremoved. With this masking, the processing of the current application program can be protected. In addition, since the DMA done interrupt is masked with the interrupt factor left unremoved, the DMA done interrupt occurs again upon removal of the interrupt masking, to enable resumption of the application program in which the miss hit interrupt has occurred.

Embodiment 12

Figure 14:
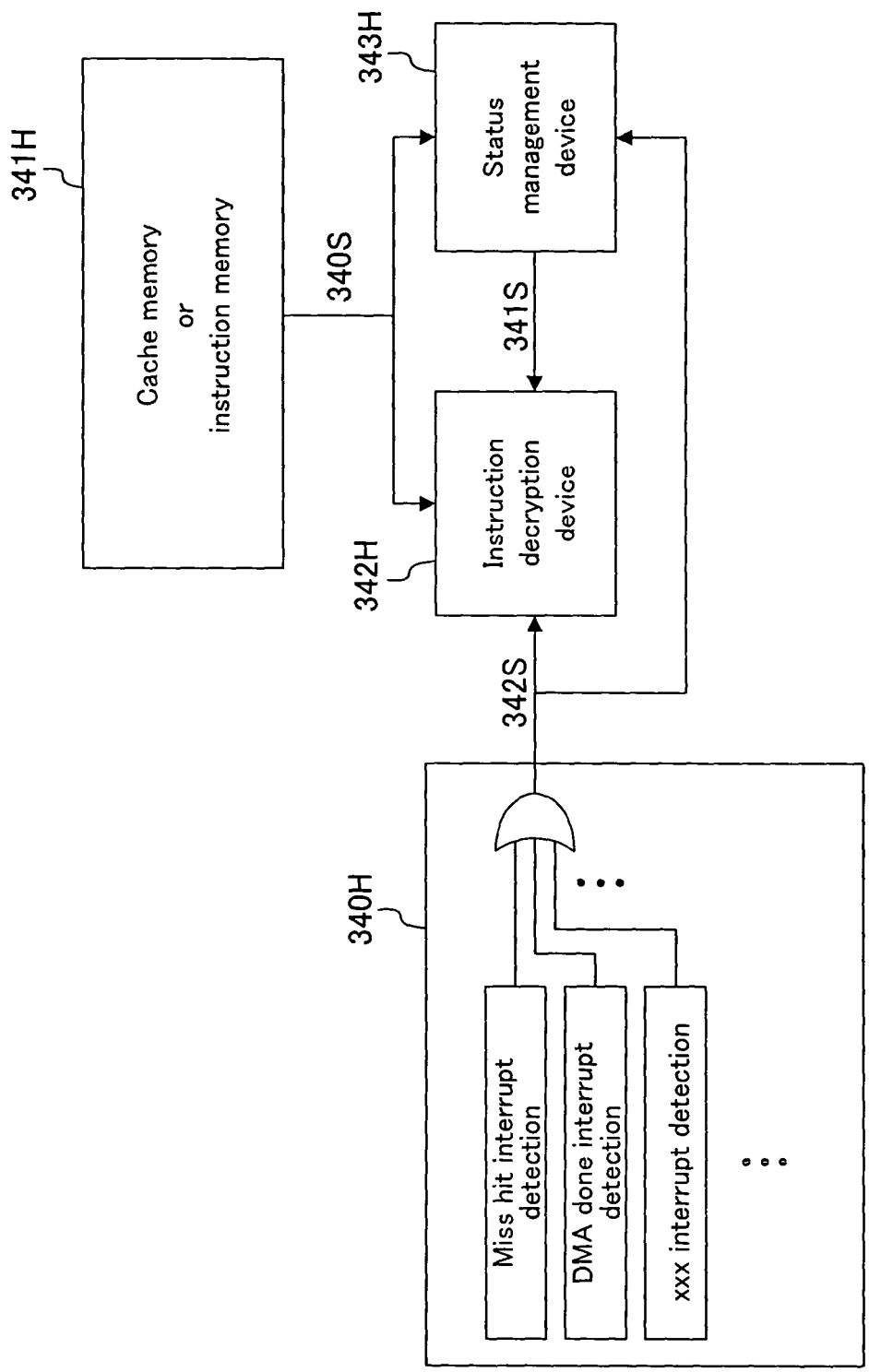
FIG. 14 is a block diagram showing the relationship among a memory, an instruction decryption device, a status management device and an interrupt management mechanism in an information processing control system of Embodiment 12 of the present invention.
Figure 15:
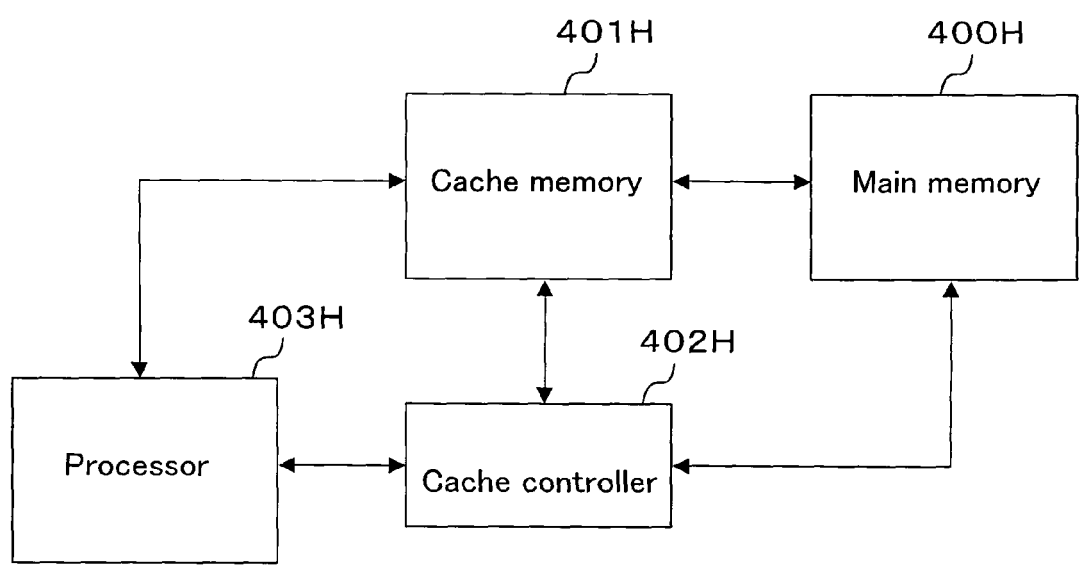
FIG. 15 is a view showing a configuration of an information processing control system using a general cache.
Figure 16:
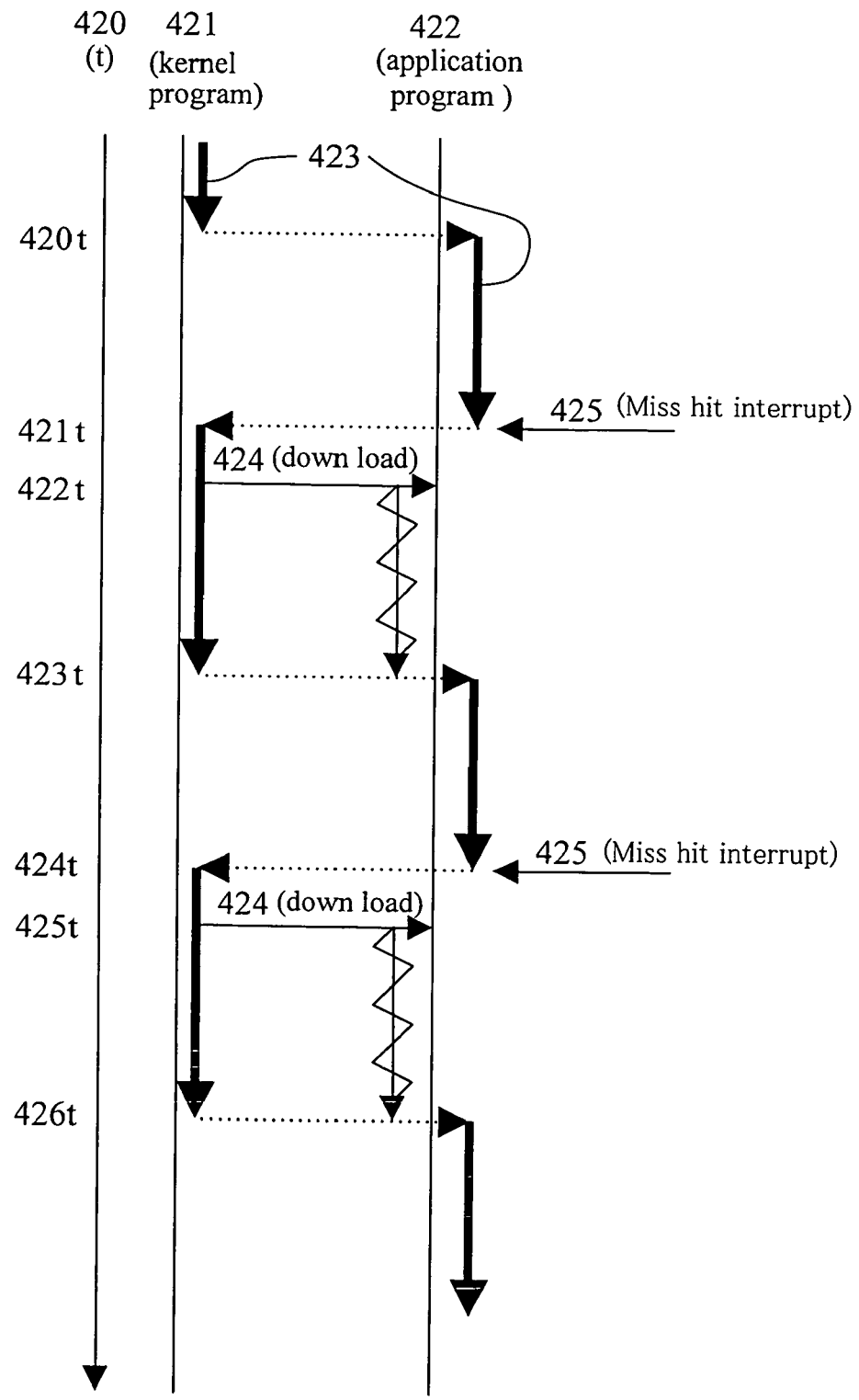
FIG. 16 is a view showing a general flow of programs followed when a program is executed while instructions stored in a cache memory are swapped.
Figure 17:
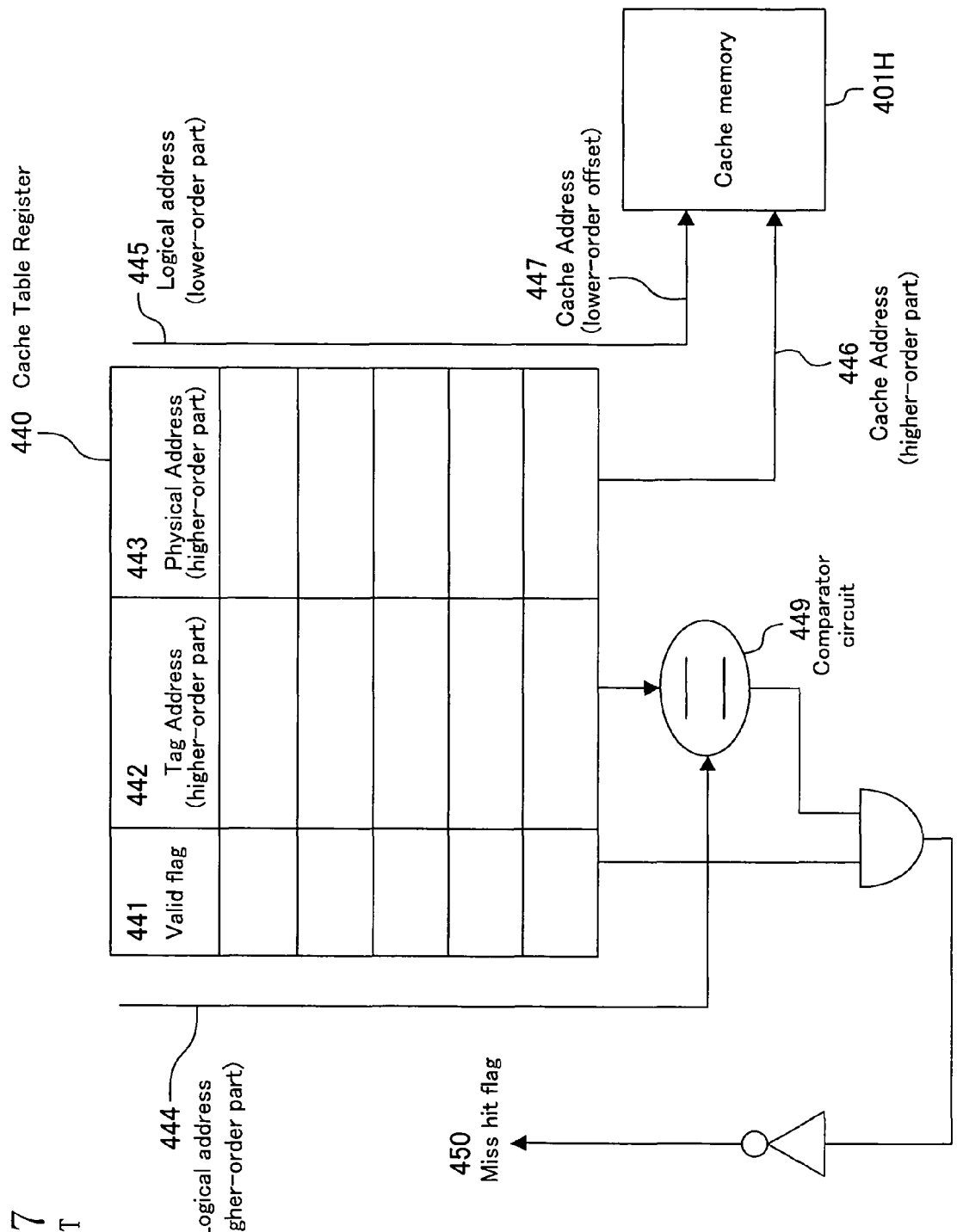
FIG. 17 is a block diagram showing a general configuration of a cache table register in a cache controller and a cache memory.

FIG. 14 is a block diagram of an information processing control system of Embodiment 12 of the present invention. Referring to FIG. 14, the information processing control system includes an interrupt management mechanism 340H, a memory 341H for storing a program, an instruction decryption device 342H and a status management device 343H. The reference numeral 340S denotes a signal line for sending instructions, 341S denotes a control line provided for the status management device 343H to control the instruction decryption device 342H, and 342S denotes a control line provided for the interrupt management mechanism 340H to control the instruction decryption device 342H and the status management device 343H. This status management device 343H is not normally included in a processor. However, in the case that something other than instructions, such as encrypted information, for example, is included in an instruction bit field, a status management device that varies the status with the encrypted information may be provided, in addition to an instruction decryption device for decrypting normal instructions. In this case, the instruction decryption method used in the instruction decryption device 342H changes with the control signal 341S output from the status management device 343H.

In FIG. 14, once the interrupt management mechanism 340H detects an interrupt, the control line 342S connected to the instruction decryption device 342H and the status management device 343H goes active. With 342S being active, the output of the instruction decryption device 342H is negated (i.e., suppressed), and also the status management device 343H is reset.

As described above, in Embodiment 12, by resetting the status management device 343H upon occurrence of an interrupt, the status management device is prevented from falling in a wrong state due to receiving an invalid instruction, and thus normal instruction decryption can be ensured after resumption from the interrupt.

The present invention is applicable to systems required to achieve real time processing while swapping instructions stored in a cache memory, such as MPEG AV decoders and digital TV-related LSIs.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A system having a processor for executing a first program containing a first group of instructions, and a second program containing a second group of instructions, and a third program containing a third group of instructions, the system comprising:
a main memory configured to store the first program, the second program and the third program;
a cache memory configured to store the first program, the second program and the third program;
a register configured to store one of:
a first start address in the first program at which preloading of the second program starts during execution of the first program, and
a second start address in the second program at which preloading of the third program starts during execution of the second program; and
a preloader configured to:
start to preload the second program from the main memory to the cache memory by using a program counter for preloading, when an execute address of the first program matches the first start address during execution of the first program,
complete the preloading of the second program before execution of the second program, while executing a remaining portion of the first program,
start to preload the third program from the main memory to the cache memory by using a program counter for preloading, when an execute address of the second program matches the second start address during execution of the second program, and
complete the preloading of the third program before execution of the third program, while executing a remaining portion of the second program.

* * * * *